(12) United States Patent
Muth

(10) Patent No.: US 7,710,895 B2
(45) Date of Patent: May 4, 2010

(54) SELECTIVE MODE PHY DEVICE AND METHOD FOR MANAGING POWER UTILIZATION USING SAME

(75) Inventor: James Muth, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 431 days.

(21) Appl. No.: 11/724,464

(22) Filed: Mar. 14, 2007

(65) Prior Publication Data

US 2008/0232397 A1 Sep. 25, 2008

(51) Int. Cl.
H04L 12/26 (2006.01)
(52) U.S. Cl. .......... 370/252; 370/465
(58) Field of Classification Search .......... None
See application file for complete search history.

(56) References Cited

U.S. PATENT DOCUMENTS

| | | | |
|---|---|---|---|
| 6,765,599 B2* | 7/2004 | Nagai et al. | 345/520 |
| 2007/0121663 A1* | 5/2007 | Yousefi et al. | 370/446 |
| 2008/0030202 A1* | 2/2008 | Wang | 324/533 |

FOREIGN PATENT DOCUMENTS

| | | |
|---|---|---|
| EP | 1662643 | 5/2006 |
| WO | WO 2006/116554 | 11/2006 |

OTHER PUBLICATIONS

Decusatis, C.M., Fiber Optic Cable Infrastructure and Dispersion Compensation for Storage Area Networks, IEEE Communications Magazine, vol. 43, No. 3, pp. 86-92 (Mar. 2005).
Babla, C., Addressing Challenges in Serial 10 Gb/s Multimode Fiber Enterprise Networks, IEEE Communications Magazine, vol. 43, No. 2, pp. S22-S28 (Feb. 2005).
Anand, et al., Characterization of Alien-Next in 10Gbase-T Systems, Electrical and Computer Engineering, Canadian Conference on Saskatoon, SK, Canada May 1-4, 2005, IEEE, pp. 1093-1096 (May 2005).

* cited by examiner

*Primary Examiner*—Steven H Nguyen
(74) *Attorney, Agent, or Firm*—Farjami & Farjami LLP

(57) ABSTRACT

There is provided a method of managing power utilization for use by a first communication system having a first communication mode and a second communication mode, for communication over a PHY connection through a cable connecting the two systems. The method comprises establishing the PHY connection with the second communication system, detecting interoperability of the two systems in the first communication mode, determining a length of the cable connecting the first communication system to the second communication system, selecting a mode based on the length of the cable, if the detecting detects interoperability of the first communication system and the second communication system in the first communication mode, selecting the second communication mode as the mode, if the detecting does not detect interoperability of the first communication system and the second communication system in the first communication mode, communicating data using the PHY connection through the cable in the mode.

15 Claims, 4 Drawing Sheets

SELECTIVE MODE PHY DEVICE AND METHOD FOR MANAGING POWER UTILIZATION USING SAME

BACKGROUND OF THE INVENTION

1. Field of the Invention

The present invention relates generally to data and voice communications. More particularly, the present invention relates to network devices.

2. Background Art

Over the last several years, data transfer needs at all levels of network communication have grown dramatically. The growing demand for high data transfer capabilities in even PANs (personal area networks), fueled by ever increasing consumer desire for and reliance on electronic media access, has resulted in data transfer rate requirements for routine communications that would have been reserved for specialized communication needs in the recent past. Consequently, 10 GbE (10 gigabit Ethernet) speeds in use almost exclusively in WANs (wide area networks) and MANs (municipal area networks) only a short time ago are now used in localized datacenters as well.

The transition to 10 GbE in the datacenter or LAN (local area network) setting presents distinct challenges associated with the number of interconnects required, the highly variable length of those interconnects, and the extent to which the cabling providing those interconnects must withstand physical deformations through twisting and bending. Fiber optic cables, which have served as the backbone of 10 GbE over wider network configurations may be suboptimal choices for high speed LAN communications due to their cost and relative fragility. Copper cables, on the other hand, which have served as a staple physical medium in the lower speed 1 GbE LAN setting, consume large amounts of power at 10 GbE, restricting port density. An additional concern for 10 GbE over copper cables is latency, which can be as much as an order of magnitude greater than for optical cables.

One conventional approach to supporting 10 GbE communication in LANs is an optical cable solution, shown in FIG. 1. As seen there, networking system 100 includes communication system 108 having connection port 106, in communication with a remote communication system (not shown) through optical cable 102 having connection plug 104. In a typical optical cable solution for 10 GbE, connection port 106 may be an SFP+(small form-factor pluggable plus) module, for example, and connection plug 104 may be an LC (Lucent Connector) designed for use with an SFP+ module. In this conventional solution, connection port 106 is in communication with PHY (physical layer) device 110 supporting EDC (electronic dispersion compensation), through a 4-pin connection to circuit board 112, on which PHY device 110 is situated.

Advantages provided by the approach illustrated in FIG. 1 are low power dissipation and low latency. Despite those advantages, the drawbacks associated with the conventional approach create substantial roadblocks to widespread LAN implementation of this solution. Those drawbacks include the cost of individual fiber optic cables, which inflate overall costs very rapidly in the LAN environment, where common configurations call for port densities of up to 96 ports per device. In addition, fiber optic cables are susceptible to breakage when heavily manipulated, adding to potential costs and consumption of maintenance resources.

Another conventional approach to supporting 10 GbE communication in LANs is a copper cable solution, shown in FIG. 2. As seen there, networking system 200 includes communication system 208 having connection port 206, in communication with a remote communication system (not shown) through copper cable 202 having connection plug 204. In a typical copper cable solution for 10 GbE, connection plug 204 may be an RJ-45 type connector, for example, connected to an Ethernet port at connection port 206. In this conventional solution, connection port 206 is in communication with PHY device 210 supporting 10 GbE, through circuit board 212, on which PHY device 210 is situated.

Advantages provided by this conventional approach include low cost and the durability of copper cabling when compared to optical cables. Drawbacks associated with conventional copper cable solutions are significant as well, however. Power dissipation, which can vary with cable length, may range as high as 10 Watts for a 100 m copper cable connection. That demand for power may place too low a threshold on the number of ports that may be supported on existing datacenter chassis, resulting either in inefficient use of existing systems, or their costly replacement. Latency is also an issue for 10 GbE over copper cable, where values as high as 2.5 microseconds are seen.

Accordingly, there is a need to overcome the drawbacks and deficiencies in the art by providing network solutions that can offer cost effective, durable, and power sparing alternatives to conventional approaches to supporting 10 GbE.

SUMMARY OF THE INVENTION

A selective mode PHY device and method for managing power utilization using same, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
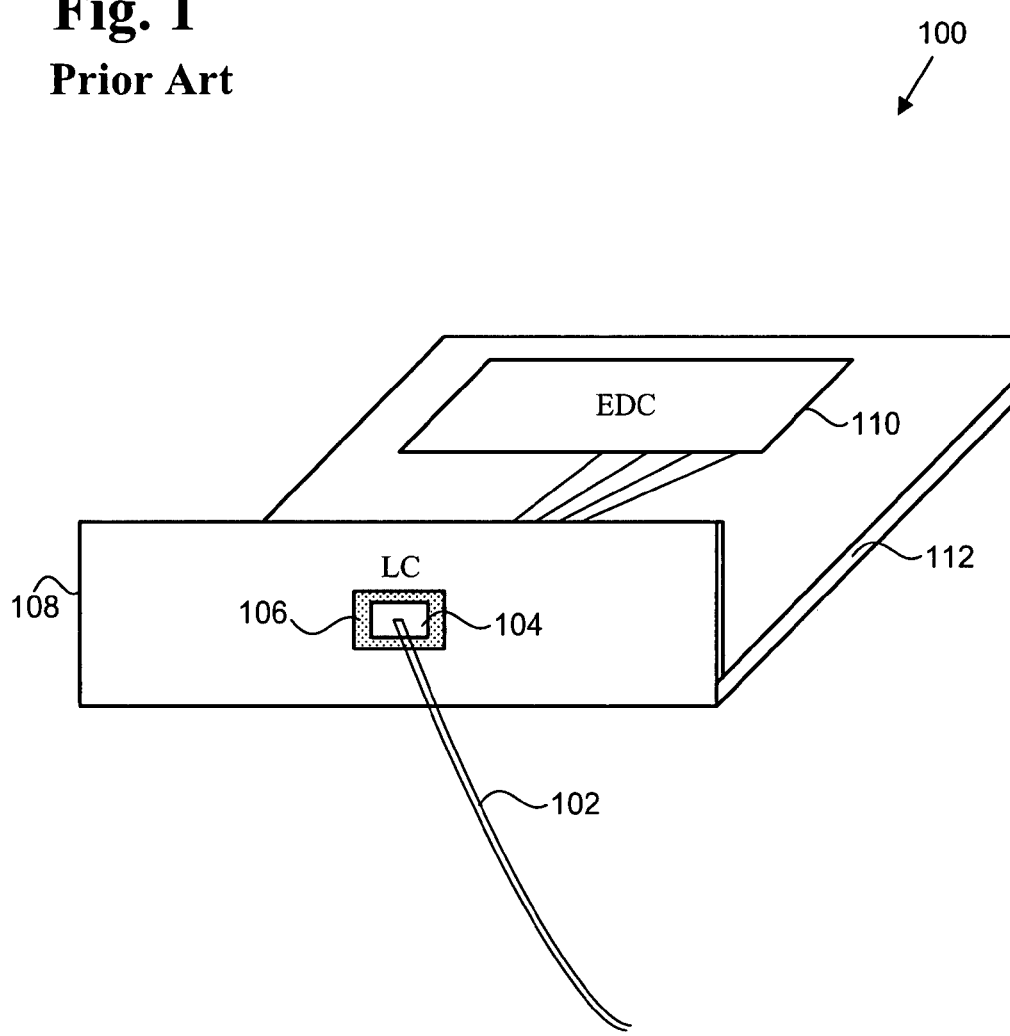
FIG. 1 illustrates a conventional optical cable networking system.

The present invention is directed to a selective mode PHY device and method for managing power utilization using same. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2:
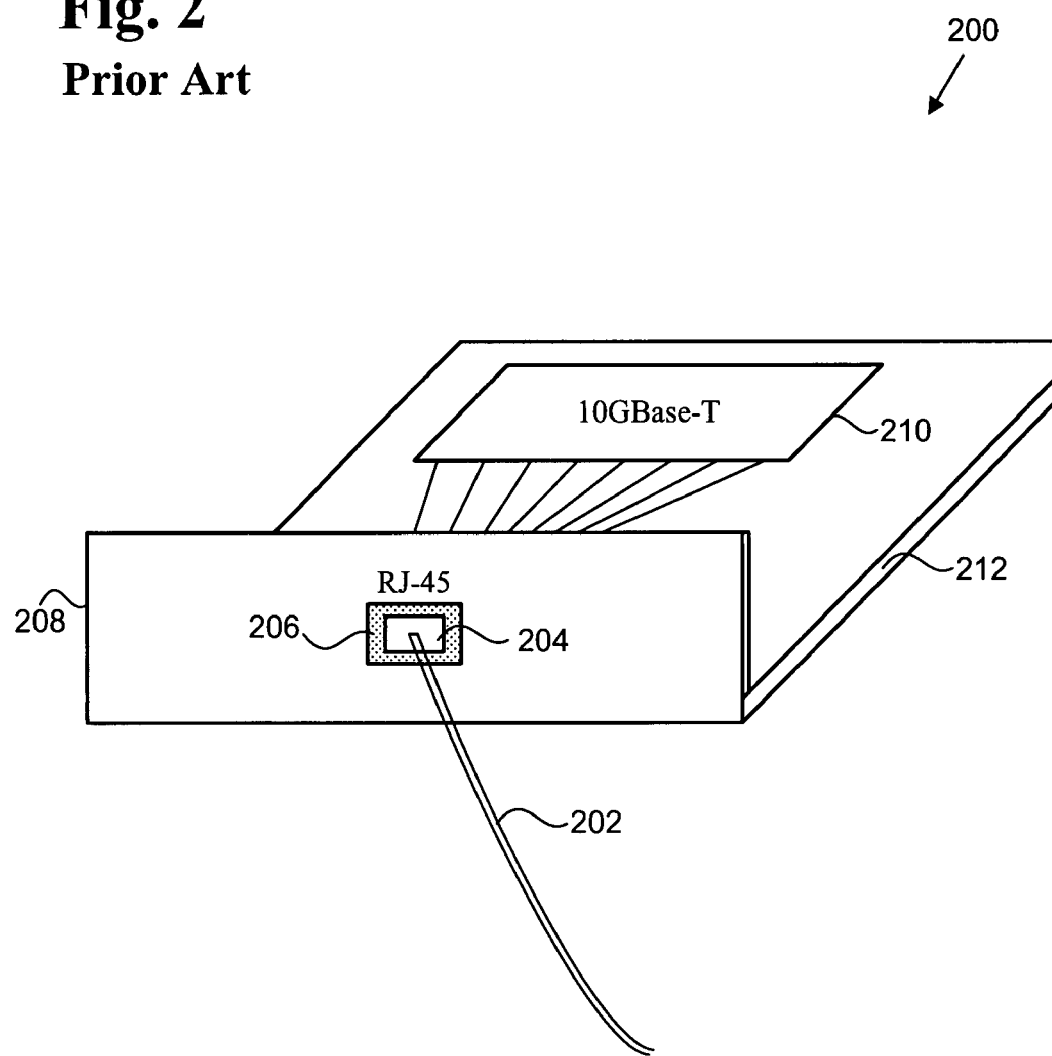
FIG. 2 illustrates a conventional copper cable networking system.

In the typical datacenter or LAN environment previously referred to in relation to FIG. 1 and FIG. 2, cable lengths range from a few meters up to 100 meters. The industry standard for 10 GbE over 8-wire twisted pair copper cable, 10 GBase-T, provides for communication over this range of cable lengths, and is used in conventional copper cable networking solutions, such as the copper cable solution illustrated in FIG. 2. Power requirements for communication in 10 Gbase-T varies with cable length, from as much as approximately 10 Watts for 100 m, to as little as 4-5 Watts for shorter cable lengths. As a result, full power of approximately 10 Watts is utilized for all cable lengths in the conventional solutions.

As an alternative to high power 10 Gbase-T communication, EDC may be used over copper cables in certain situations. Despite being developed to compensate for dispersion in fiber optics systems, such as the optical cable solution illustrated in FIG. 1, it is known in the art that EDC can be used for signal processing on copper cables over relatively short cable lengths. For copper cable lengths of less than approximately 15 m for example, a PHY device running EDC may be used to communicate data so as to provide the power dissipation and latency advantages associated with its use over optical cables. Due to the relative shortness of the lengths of copper cable over which EDC may be used, however, EDC over copper cable is not widely practicable.

Instead, conventional solutions, like those shown in FIGS. 1 and 2, turn either to EDC over optical cables or to 10 GBase-T over copper cables, treating the EDC and 10 GBase-T communication modes as mutually exclusive and distinct solutions. Unfortunately, the substantial drawbacks accompanying both alternatives makes neither an optimum solution for 10 GbE networking requirements. As a result, the conventional approach, which treats them as either/or propositions, falls short of resolving the challenges presented by widespread demand for 10 GbE speeds.

Figure 3:
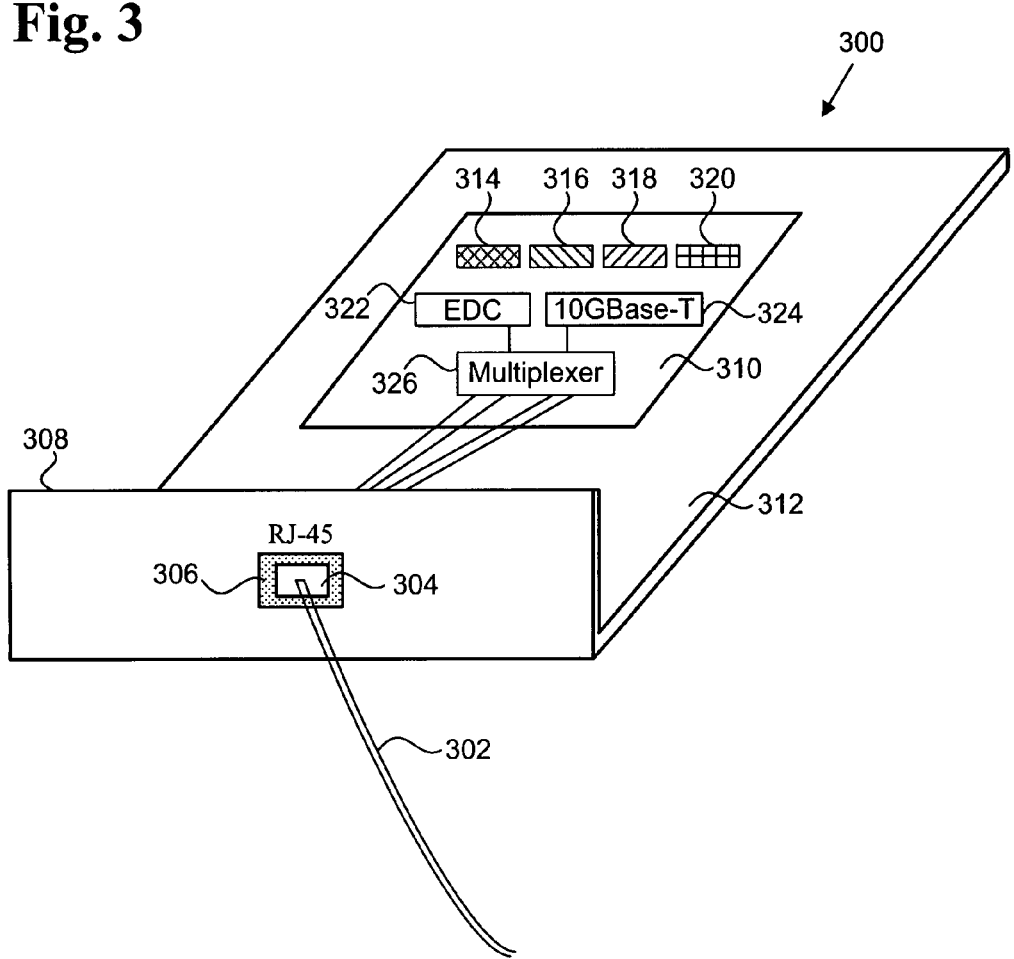
FIG. 3 illustrates a networking system capable of supporting network communication, according to one embodiment of the present invention.

FIG. 3 illustrates networking system 300, capable of supporting network communication, and offering the cost and durability advantages of copper cable and the lower power and latency advantages of EDC, according to one embodiment of the present invention. In the embodiment of FIG. 3, networking system 300 includes first communication system 308 having connection port 306, in communication with a second communication system (not shown) through cable 302 having connection plug 304. According to the present embodiment, connection port 306 is in communication with selective mode PHY device 310 through an 8-pin connection to circuit board 312. PHY device 310 comprises detector 314 for detecting interoperability with a second communication system, transmitter 316 and receiver 318 capable of transmitting and receiving cable length sensing signals, and communication mode selector 320. In addition, PHY device 310 includes a first communication mode controller 322, a second communication mode controller 324, and multiplexer 326. Networking system 300 is suitable for use in a LAN or a datacenter, for example.

In the embodiment of FIG. 3, selective mode PHY device 310 is configured to determine the length of cable 302, to select between a first communication mode—in this embodiment EDC mode—and a second communication mode—in this embodiment 10 GBase-T mode, based on the length of cable 302, and interoperability with the second communication system in EDC mode, where interoperability may be detected through autonegotiation, as is known in the art. Selective mode PHY device 310 is capable of operating in the low power, low latency EDC mode, or in 10 GBase-T mode. Moreover, when operating in 10 GBase-T mode, selective mode PHY device 310 can adjust the utilized power level based on cable length. Consequently, in contrast to conventional solutions, the present embodiment offers a networking solution providing the advantages associated with each conventional approach described previously, while reducing the negative impact of the drawbacks associated with both.

Returning to FIG. 3, networking system 300 shows an embodiment of the present invention in which selective mode PHY device 310, capable of sensing cable length and of operating in both EDC and 10 GBase-T modes, communicates with a second communication system (not shown) through cable 302 connected to communication system 308 through connection port 306. Communication system 308 may be a switch or a router for example. In the present embodiment, cable 302 is a copper cable for use in 10 GBase-T communication, i.e. 8-wire twisted pair copper cable. Cable 302 is equipped with connection plug 304, which according to the present embodiment is an RJ-45 connector.

Continuing with FIG. 3, RJ-45 connection plug 304 connects to communication system 308 through connection port 306, which may be a standard Ethernet port, or an SFP+ module configured to accept an RJ-45 connection plug, for example. In other embodiments, connection port 306 may be an XFP (10 Gigabit small form-factor pluggable), X2, or Xenpak module, configured to accept an RJ-45 connection plug, for example. Connection port 306 connects cable 302 and selective mode PHY device 310 through an 8-pin connector on circuit board 312. Not all available cable wires need be recruited for data communication in every case, however. When selective mode PHY device 310 selects EDC mode based on the length of cable 302 and interoperability with the second communication system in that mode, less than all eight wires available in cable 302 are used for the EDC communication, for example, four wires are used. In addition, power utilization in EDC mode is less than approximately 2 Watts per port, while signal latency is on the order of several hundred nanoseconds.

When selective mode PHY device 310 selects 10 GBase-T mode, rather than EDC mode, either because cable 302 is less than optimal for EDC mode, or because first communication system 308 and the second communication system lack interoperability in EDC mode, all wires available in cable 302 may be put to use. In 10 GBase-T mode, power utilization ranges from approximately 4 Watts to approximately 10 Watts, depending upon the length of cable 302, with signal latency of approximately 2.5 microseconds. Thus, configured to function in the manner described above, selective mode PHY device 310 provides management of power utilization and signal processing performance by communicating in the lowest power state appropriate to the circumstances, i.e. in the low power and low latency EDC mode when possible, or at a reduced power level in 10 GBase-T mode, when cable length is determined to be acceptable.

Figure 4:
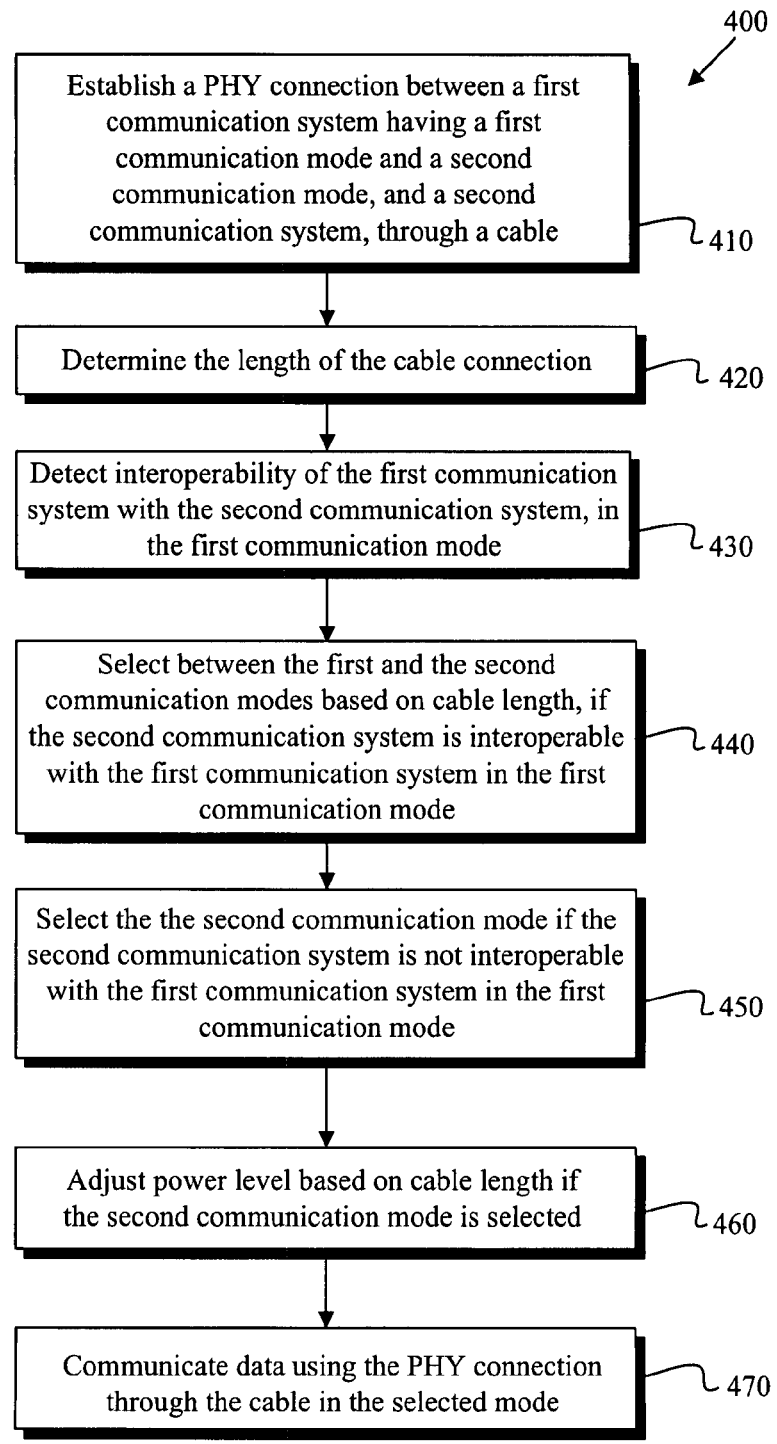
FIG. 4 is a flow diagram illustrating a method for managing power utilization for data communication, according to one embodiment of the present invention.

The operation of networking system 300 is now described in conjunction with FIG. 4, which illustrates power management method 400 for use by selective mode PHY device 310. Certain details and features have been left out of flow diagram 400 that are apparent to a person of ordinary skill in the art. For example, a step may consist of one or more substeps or may involve specialized equipment or materials, as known in the art. While steps 410 through 470 indicated in flow chart 400 are sufficient to describe one embodiment of the present invention, other embodiments of the invention may utilize steps different from those shown in flow chart 400, or may include more, or fewer steps.

At step 410, first communication system 308, which includes selective mode PHY device 310 capable of operating in EDC mode or 10 GBase-T mode, is connected to a second communication system (not shown) by 8-wire twisted pair copper cable 302, through RJ-45 connector 304 and connection port 306. At step 420, first communication system 308 determines the length of copper cable 302. Cable length determination may be accomplished in a variety of ways, including differential analysis of a signal and its echo, transmitted by transmitter 316 and received by receiver 318, in a TDR (time-domain refletometry) process, or through BER (bit error rate) monitoring, for example. Next, at step 430, first communication system 308 detects interoperability with the second communication system in EDC mode, using detector 314 in an autonegotiation procedure known in the art.

At step 440, selective mode PHY device 310 initiates a communication mode selection protocol, using communication mode selector 320. If detector 314 detects interoperability of first communication system 308 and the second communication system in EDC mode in step 430, communication mode selector 320 on PHY device 310 will select a communication mode based on the length of cable 302 sensed in step 420. When the cable length is determined to be less than or equal to a predetermined length appropriate for EDC operation, for example, fifteen meters, EDC mode may be selected. When the cable length is determined to be greater than a predetermined length appropriate for EDC operation, 10 GBase-T mode is selected.

If, however, interoperability detection step 430 does not detect interoperability of first communication system 308 and the second communication system in EDC mode, 10 GBase-T mode will be selected as the default communication mode in step 450, regardless of the length of cable 302. Next, at step 460, selective mode PHY device 310 manages power utilization by adjusting the communication power level according to the length of cable 302 if 10 GBase-T communication mode was selected in step 440 or 450. Operating in 10 GBase-T mode, power utilization may be as little as approximately 4 Watts for a cable length of 30 meters, for example. By determining the cable length and adjusting the power utilization accordingly, PHY device 310 reduces power dissipation when compared with conventional solutions operating in 10 GBase-T mode over copper cable. Thus, even when the lowest power EDC mode is not selected, power dissipation in the higher power 10 GBase-T mode may be minimized through the present embodiment's management of power utilization based on cable length. Finally, at step 470, first communication system 308 communicates with a second communication system through cable 302 using the present invention's selective mode PHY device and method for managing power utilization using same.

In another embodiment, power management method 400 may not include interoperability detection step 430. In that embodiment, communication mode selection could be made on the basis of cable length alone. Further, method 400 may determine the cable length prior to establishing the PHY connection in step 410. When the cable length is determined to be less than or equal to a predetermined length appropriate for EDC operation, for example, fifteen meters, EDC mode is selected and communication is controlled by first communication mode controller 322. When the cable length is determined to be greater than a predetermined length appropriate for EDC operation, 10 GBase-T mode is selected and second communication mode controller 324 controls communication. Moreover, when the cable length is determined to be greater than a predetermined length appropriate for EDC operation, second communication mode controller 324 may use the cable length determination to adjust power dissipation in 10 GBase-T mode.

Thus, the present invention manages power utilization for data communication, and provides cost effective, durable and power sparing solutions for high speed networking needs. By enabling use of the same communication port and the same cable for communication in more than one mode, and adjusting power utilization according to cable length, the present invention makes it possible to advantageously distribute power amongst network ports and thereby enhance efficiency. In a datacenter environment requiring 10 GbE speeds, for example, one described embodiment offers the low cost and durability of copper cable connections, while providing the flexibility to support EDC, with its lower power dissipation and low latency advantages.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of managing power utilization for use by a first communication system having a first communication mode and a second communication mode, for communication over a PHY connection through a cable connecting said first communication system to a second communication system, said method comprising:

establishing said PHY connection with said second communication system;

determining a length of said cable connecting said first communication system to said second communication system;

detecting interoperability of said first communication system and said second communication system in said first communication mode;

selecting a mode between said first communication mode and said second communication mode based on said length of said cable, if said detecting detects interoperability of said first communication system and said second communication system in said first communication mode;

selecting said second communication mode as said mode, if said-detecting does not detect interoperability of said first communication system and said second communication system in said first communication mode;

communicating data using said PHY connection through said cable in said mode.

2. The method of claim 1, wherein said first communication mode is an EDC mode.

3. The method of claim 1, wherein said second communication mode is a 10 GBase-T mode.

4. The method of claim 1 further comprising adjusting a communication power level based on said length of said cable when said second communication mode is selected.

5. The method of claim 1, wherein said first communication mode is selected as said mode if said length of said cable is less than or equal to a predetermined length.

6. The method of claim 5, wherein said-second communication mode is selected as said mode if said length of said cable is greater than said predetermined length.

7. The method of claim 1, wherein said cable includes an RJ-45 connector plug.

8. The method of claim 1, wherein said PHY connection is made through a connection port selected from the group consisting of an SFP+ module, an XFP module, an X2 module, and an XENPAK module, configured to accept an RJ-45 plug.

9. A selective mode PHY device for use by a first communication system to manage power utilization for data communication with a second communication system through a cable, comprising:
    a detector configured to determine interoperability of said first communication system and said second communication system in a first communication mode;
    a transmitter configured to transmit cable length sensing signals;
    a receiver configured to receive said cable length sensing signals;
    a communication mode selector configured to determine a length of said cable from said cable length sensing signals, and to select a mode between said first communication mode and a second communication mode based on said length of said cable if said detector detects interoperability of said first communication system and said second communication system in said first communication mode, and to select said second communication mode as said mode if said detector does not detect interoperability of said first communication system and said second communication system in said first communication mode.

10. The selective mode PHY device of claim 9 further comprising:
    a first communication mode controller configured to support data communication through said cable in said first communication mode;
    a second communication mode controller configured to support data communication through said cable in said second communication mode;
    wherein said selective mode PHY device supports data communication through a cable in said communication mode.

11. The selective mode PHY device of claim 9, wherein said first communication mode is an EDC mode.

12. The selective mode PHY device of claim 9, wherein said second communication mode is a 10 Gbase-T mode.

13. The selective mode PHY device of claim 9, further configured to adjust a communication power level based on said length of said cable when said second communication mode is selected.

14. The selective mode PHY device of claim 9, wherein said first communication mode is selected as said mode if said length of said cable is less than or equal to a predetermined length.

15. The selective mode PHY device of claim 14, wherein said second communication mode is selected as said mode if said length of said cable is greater than said predetermined length.

* * * * *